(12) United States Patent
Ellis et al.

(10) Patent No.: US 7,078,089 B2
(45) Date of Patent: Jul. 18, 2006

(54) LOW-COST ELASTIC LAMINATE MATERIAL

(75) Inventors: Clifford Jackson Ellis, Woodstock, GA (US); Arthur Edward Garavaglia, Alpharetta, GA (US); Jay Sheldon Shultz, Roswell, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 506 days.

(21) Appl. No.: 10/035,093

(22) Filed: Dec. 28, 2001

(65) Prior Publication Data

US 2003/0124310 A1    Jul. 3, 2003

(51) Int. Cl.
 B32B 3/10    (2006.01)
 B32B 5/04    (2006.01)
 B27N 3/10    (2006.01)
 B29C 31/00   (2006.01)
 D04H 13/00   (2006.01)

(52) U.S. Cl. .................. 428/138; 428/131; 428/518; 428/516; 428/515; 428/198; 428/219; 428/220; 442/328; 442/364; 442/374; 442/381; 442/394; 442/399; 442/396; 442/398; 156/242; 156/209; 156/163; 156/164; 156/229; 156/290; 156/184; 156/176; 156/166; 156/244.11

(58) Field of Classification Search .................. 428/138, 428/131, 518, 516, 515, 198, 219, 220; 442/328, 442/364, 374, 381, 394, 399, 396, 398; 156/242, 156/209, 163, 164, 229, 290, 184, 176, 166, 156/244.11

See application file for complete search history.

(56) References Cited

U.S. PATENT DOCUMENTS

| | | | |
|---|---|---|---|
| 3,849,241 A | 11/1974 | Buntin | |
| 3,855,046 A | 12/1974 | Hansen et al. | |
| 4,193,751 A | 3/1980 | Miller | |
| 4,488,928 A | 12/1984 | Alikhan et al. | |
| 4,522,203 A | 6/1985 | Mays | |

(Continued)

FOREIGN PATENT DOCUMENTS

| | | |
|---|---|---|
| EP | 0315507 A2 | 5/1989 |
| EP | 0420256 A2 * | 4/1991 |
| WO | 95/19258 | 7/1995 |
| WO | 00/39201 | 7/2000 |
| WO | 01/00398 | 1/2001 |

OTHER PUBLICATIONS

Petterson, D. R., " Mechanics of Nonwoven Fabrics" Aug. 1959, Industiral and Engineering Chemistry, vol. 51, No. 8, pp. 902–903.*

PCT International Search Report, Jan. 3, 2003, for International Application No. PCT/US 02/23598.

Primary Examiner—William P. Watkins, III
(74) Attorney, Agent, or Firm—Robert A. Aubrose

(57) ABSTRACT

Disclosed herein are elastic laminate materials. The elastic laminate materials are laminates of extensible nonwoven fibrous webs and thermoplastic elastic materials. The laminate may be a two-layer composite material having a single nonwoven fibrous web bonded to one side of the thermoplastic elastic material, or it may be a three-layer composite having a nonwoven fibrous web bonded to each side of the thermoplastic elastic material. The extensible nonwoven fibrous webs may be staple fiber webs. The thermoplastic elastic material may be single-layer or multi-layer elastic films, or elastic fibrous layers. Where single- or multi-layer elastic films are used, the films may be breathable films. The elastic material, or some of the staple fibers, or both, may be selected such that the staple fiber webs are thermally compatible with the thermoplastic elastic material to facilitate laminate bonding. Processes for forming the elastic laminate material are also disclosed.

25 Claims, 3 Drawing Sheets

U.S. PATENT DOCUMENTS

| | | | |
|---|---|---|---|
| 4,720,415 A | | 1/1988 | Vander Wielen et al. |
| 4,725,473 A | | 2/1988 | Van Gompel et al. |
| 4,734,324 A | | 3/1988 | Hill |
| 4,965,122 A | | 10/1990 | Morman |
| 4,981,747 A | | 1/1991 | Morman |
| 5,108,820 A | | 4/1992 | Kaneko et al. |
| 5,108,827 A | | 4/1992 | Gessner |
| 5,226,992 A | | 7/1993 | Morman |
| 5,272,236 A | | 12/1993 | Lai et al. |
| 5,278,272 A | | 1/1994 | Lai et al. |
| 5,300,365 A | | 4/1994 | Ogale |
| 5,332,613 A | | 7/1994 | Taylor et al. |
| 5,334,446 A | | 8/1994 | Quantrille et al. |
| 5,336,545 A | | 8/1994 | Morman |
| 5,336,552 A | | 8/1994 | Strack et al. |
| 5,382,400 A | | 1/1995 | Pike et al. |
| 5,385,775 A | | 1/1995 | Wright |
| 5,393,599 A | | 2/1995 | Quantrille et al. |
| 5,413,849 A | * | 5/1995 | Austin et al. ............... 442/329 |
| 5,431,991 A | | 7/1995 | Quantrille et al. |
| 5,494,736 A | | 2/1996 | Willey et al. |
| 5,539,056 A | | 7/1996 | Yang et al. |
| 5,596,052 A | | 1/1997 | Resconi et al. |
| 5,620,779 A | | 4/1997 | Levy et al. |
| 5,635,290 A | * | 6/1997 | Stopper et al. ............. 428/198 |
| 5,695,868 A | | 12/1997 | McCormack |
| 5,709,921 A | | 1/1998 | Shawver |
| 5,804,286 A | | 9/1998 | Quantrille et al. |
| 5,851,935 A | | 12/1998 | Srinivasan et al. |
| 5,914,084 A | | 6/1999 | Benson et al. |
| 5,932,497 A | | 8/1999 | Morman et al. |
| 5,947,944 A | * | 9/1999 | Hetzler et al. ............... 604/366 |
| 5,997,989 A | * | 12/1999 | Gessner et al. ............. 428/152 |
| 6,015,764 A | | 1/2000 | McCormack et al. |
| 6,027,483 A | * | 2/2000 | Chappell et al. ....... 604/385.01 |
| 6,060,009 A | * | 5/2000 | Welygan et al. ............. 264/167 |
| 6,069,097 A | | 5/2000 | Suzuki et al. |
| 6,069,668 A | * | 5/2000 | Woodham et al. .......... 348/578 |
| 6,096,668 A | * | 8/2000 | Abuto et al. ................. 442/328 |
| 6,111,163 A | | 8/2000 | McCormack et al. |
| 6,114,024 A | | 9/2000 | Forte |
| 6,114,263 A | | 9/2000 | Benson et al. |
| 6,129,801 A | | 10/2000 | Benson et al. |
| 6,238,767 B1 | | 5/2001 | McCormack et al. |
| 6,245,401 B1 | | 6/2001 | Ying et al. |
| 6,309,736 B1 | | 10/2001 | McCormack et al. |

* cited by examiner

LOW-COST ELASTIC LAMINATE MATERIAL

TECHNICAL FIELD

This invention relates to elastic laminate materials, particularly to laminates of extensible nonwoven fibrous webs and thermoplastic elastic materials, and processes for making the same.

BACKGROUND OF THE INVENTION

Many of the medical care products, protective wear garments, mortuary and veterinary products, and personal care products in use today are available as disposable products. By disposable, it is meant that the product is used only a few times, or even only once, before being discarded. Examples of such products include, but are not limited to, medical and health care products such as surgical drapes, gowns and bandages, protective workwear garments such as coveralls and lab coats, and infant, child and adult personal care absorbent products such as diapers, training pants, incontinence garments and pads, sanitary napkins, wipes and the like. These products must be manufactured at a cost which is consistent with single- or limited-use disposability.

Nonwoven fibrous webs formed by extrusion processes such as spunbonding and meltblowing, and by mechanical dry-forming process such as air-laying and carding, used in combination with thermoplastic film or microfiber layers, may be utilized as components of these disposable products since their manufacture is often inexpensive relative to the cost of woven or knitted components. A layer of film or microfibers may be used to impart liquid barrier properties, and an elastic layer (elastic film or elastic microfibers, for example) may be used to impart additional properties of stretch and recovery. However, films in general and elastic layers in particular, whether a film layer or a microfiber layer, often have unpleasant tactile aesthetic properties, such as feeling rubbery or tacky to the touch, making them unpleasant and uncomfortable against the wearer's skin. Nonwoven fibrous webs, on the other hand, have better tactile, comfort and aesthetic properties.

The tactile aesthetic properties of elastic films can be improved by forming a laminate of an elastic film with one or more non-elastic, extensible materials, such as nonwoven fibrous webs, on the outer surface of the elastic material.

Nonwoven fibrous webs formed from non-elastic polymers such as, for example, polyolefins are generally considered non-elastic. This lack of elasticity may restrict these nonwoven web materials to applications where elasticity is not required or desirable. When non-elastic nonwoven webs are laminated to elastic materials, the resulting laminate may also be restricted in its elastic properties.

Elastic laminate materials of elastic and non-elastic materials have been made by bonding the non-elastic material or web to the elastic material in a manner that allows the entire laminate or composite material to stretch or elongate so it can be used in disposable products. In one such laminate material, disclosed, for example, by Vander Wielen et al. U.S. Pat. No. 4,720,415, issued Jan. 19, 1988, a non-elastic web material is bonded to an elastic material while the elastic material is held stretched so that when the elastic material is relaxed, the non-elastic web material gathers between the bond locations, and the resulting elastic laminate material is stretchable to the extent that the non-elastic web material gathered between the bond locations allows the elastic material to elongate.

In another such elastic laminate material, disclosed for example by U.S. Pat. Nos. 5,336,545, 5,226,992, 4,981,747 and 4,965,122 to Morman, the non-elastic web material is necked (that is, is elongated in one direction, usually the machine direction, causing rugosities to form across the web) and is joined to the elastic material while in the non-elastic material is in the necked or elongated condition. The non-elastic material is then able to be extended in the direction perpendicular to the direction of necking, allowing for extensibility of the laminate. However, since these elastic laminate materials are often utilized in limited- or single-use disposable products, there remains a strong need for reducing the cost of producing these materials.

SUMMARY OF THE INVENTION

The present invention is directed to low cost elastic laminate materials, particularly to laminates of extensible nonwoven fibrous webs and thermoplastic elastic materials, as well as to the process for making such laminates, and to applications for using these laminates as elastic materials having cloth-like tactile aesthetic attributes.

In accordance with the invention, the extensible nonwoven fibrous webs used in the laminate may be made by conventional staple fiber webforming techniques such as carding, air-laying, or other dry-forming techniques, with the exception that the fibrous webs are laminated to the elastic material without the fibrous webs having been bonded prior to the step of laminate bonding.

The laminate may be composed of two or three layers. For example, the laminate may be a two-layer composite material having a single nonwoven fibrous web bonded to one side of the thermoplastic elastic material, or it may be a three-layer composite having a nonwoven fibrous web bonded to each side of the thermoplastic elastic material. The laminate in a particular embodiment is formed by bonding one or more of these nonwoven fibrous webs to an elastic meltblown layer. In other embodiments, the laminate is formed by bonding one or more nonwoven fibrous webs to an unwound elastic film layer, or by bonding one or more nonwoven fibrous webs to a just-extruded elastic film layer. In certain embodiments the elastic film layer may be a breathable monolithic, microporous or cellular film which acts as a barrier to passage of aqueous liquids yet allows the passage of water vapor.

In accordance with the invention, the fibers of the nonwoven fibrous web or webs must be joined or bonded to the thermoplastic elastic material to form a laminate. Useful methods of joining the nonwoven fibrous web to the thermoplastic elastic material include thermal bonding, ultrasonic bonding, and adhesive bonding. However, where a thermal bonding method is utilized and the polymers selected for the components (the elastic material and the nonwoven web or webs) are dissimilar polymers or are otherwise not thermally compatible, so much heat and pressure may be needed to effect bonding that the resulting laminate becomes stiff, or either or both of the elastic material or nonwoven web may be damaged by the bonding method. Therefore, where the polymers selected for the components are dissimilar or otherwise thermally incompatible, the elastic material may beneficially include a bonding agent to facilitate bonding the nonwoven web thereto and thereby avoid the need to apply excessive heat and pressure. Alternatively, some or all of the fibers in the nonwoven web may include a bonding agent. As another alternative, both the elastic material and some or all of the fibers of the nonwoven web may include a bonding agent. In still another alternative, the elastic material may be a multilayer film which includes a core layer of a elastic material and thin external or "skin" layers which include a bonding agent to facilitate bonding to the nonwoven web.

Such low cost elastic laminate materials have a wide variety of uses including, but not limited to, applications in medical and health care products such as surgical drapes, gowns and bandages, protective workwear garments such as coveralls and lab coats, and infant, child and adult personal care absorbent products such as diapers, training pants, incontinence garments and pads, sanitary napkins, wipes and the like.

DEFINITIONS

Figure 1:
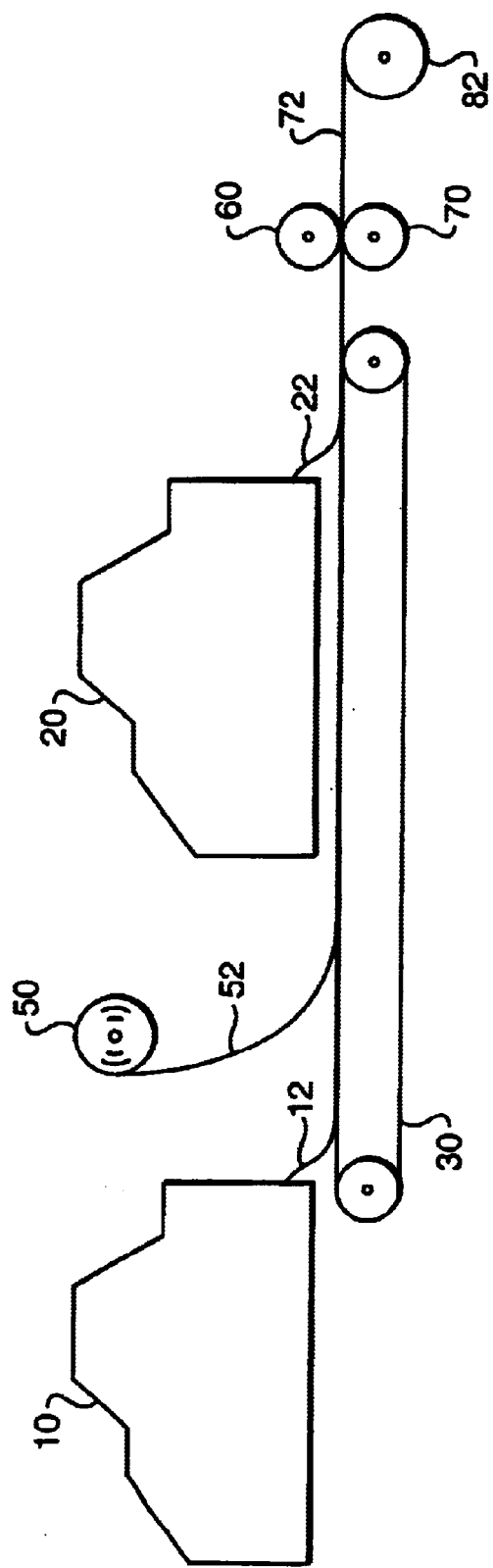
FIG. 1 is a schematic illustration of a process for forming the elastic laminate material of the present invention.

As used herein and in the claims, the term "comprising" is inclusive or open-ended and does not exclude additional unrecited elements, compositional components, or method steps.

As used herein the term "polymer" generally includes but is not limited to, homopolymers, copolymers, such as for example, block, graft, random and alternating copolymers, terpolymers, etc. and blends and modifications thereof. Furthermore, unless otherwise specifically limited, the term "polymer" shall include all possible geometrical configurations of the material. These configurations include, but are not limited to isotactic, syndiotactic and random symmetries.

As used herein, the term "elastic" when referring to a fiber, film, fabric or material means a material which upon application of a biasing force, is stretchable to a stretched, biased length dimension which is at least about 150 percent, or one and a half times, its original, unstretched length dimension, and which will recover at least 50 percent of its elongation upon release of the stretching, biasing force. As an example, a one inch (2.54 cm) length sample of elastic material will be stretchable to at least one and one half inches (3.81 cm), and upon release of the stretching force will recover to a length of not greater than one and one quarter inches (3.18 cm).

As used herein the term "monolithic" is used to mean "non-porous", therefore a monolithic film is a non-porous film. Rather than holes produced by a physical processing of the monolithic film, the film has passages with cross-sectional sizes on a molecular scale formed by a polymerization process. The passages serve as conduits by which water molecules (or other liquid molecules) can disseminate through the film. Vapor transmission occurs through a monolithic film as a result of a concentration gradient across the monolithic film. This process is referred to as activated diffusion. As water (or other liquid) evaporates on the body side of the film, the concentration of water vapor increases. The water vapor condenses and solubilizes on the surface of the body side of the film. As a liquid, the water molecules dissolve into the film. The water molecules then diffuse through the monolithic film and re-evaporate into the air on the side having a lower water vapor concentration.

As used herein, the term "microporous film" or "microporous filled film" means films which contain filler material which enables development or formation of micropores in the film during stretching or orientation of the film.

As used herein the term "filler" is meant to include particulates and other forms of materials which can be added to a film-forming polymer or blend of polymers and which will not chemically interfere with or adversely affect the extruded film but are able to be uniformly dispersed throughout the film. Generally, the fillers will be in particulate form and usually will have somewhat of a spherical shape with average particle sizes in the range of about 0.5 to about 8 microns. Generally, films utilizing a filler will usually contain about 30 percent to about 70 percent filler based upon the total weight of the film. Examples of fillers include calcium carbonate ($CaCO_3$), various kinds of clay, silica ($SiO_2$), alumina, barium sulfate, sodium carbonate, talc, magnesium sulfate, titanium dioxide, zeolites, aluminum sulfate, cellulose-type powders, diatomaceous earth, magnesium sulfate, magnesium carbonate, barium carbonate, kaolin, mica, carbon, calcium oxide, magnesium oxide, aluminum hydroxide, pulp powder, wood powder, cellulose derivative, polymer particles, chitin and chitin derivatives. The filler particles may optionally be coated with a fatty acid, such as stearic acid, which may facilitate the free flow of the particles (in bulk) and their ease of dispersion into the polymer matrix.

As used herein, the term "breathability" refers to the water vapor transmission rate (WVTR) of an area of fabric or material. Breathability is measured in grams of water per square meter per day (g/m2/24 hours). The WVTR of a material can be measured in accordance with ASTM Standard E96-80. Alternatively, for materials having WVTR greater than about 3000 g/m2/24 hours testing systems such as, for example, the PERMATRAN-W 100K water vapor permeation analysis system, commercially available from Modern Controls, Inc. (MOCON) of Minneapolis, Minn., may be used. Further, as used herein the term "breathable" refers to a fabric having a WVTR of at least 800 g/m2/24 hours.

As used herein the term "monocomponent" fiber refers to a fiber formed from one or more extruders using only one polymer. This is not meant to exclude fibers formed from one polymer to which small amounts of additives have been added for color, anti-static properties, lubrication, hydrophilicity, etc. These additives, e.g. titanium dioxide for color, are generally present in an amount less than 5 weight percent and more typically about 2 weight percent.

As used herein the term "conjugate fibers" refers to fibers which have been formed from at least two polymers, or the same polymer with different properties, extruded from separate extruders but spun together to form one fiber. Conjugate fibers are also sometimes referred to as multicomponent or bicomponent fibers. The polymers are usually different from each other though conjugate fibers may be monocomponent fibers. The polymers are arranged in substantially constantly positioned distinct zones across the cross-section of the conjugate fibers and extend continuously along the length of the conjugate fibers. The configuration of such a conjugate fiber may be, for example, a sheath/core arrangement wherein one polymer is surrounded by another or may be a side by side arrangement or an "islands-in-the-sea" arrangement. Conjugate fibers are taught in U.S. Pat. No. 5,108,820 to Kaneko et al., U.S. Pat. No. 5,336,552 to Strack et al., and U.S. Pat. No. 5,382,400 to Pike et al. For two component fibers, the polymers may be present in ratios of 75/25, 50/50, 25/75 or any other desired ratios.

As used herein the term "biconstituent fibers" refers to fibers which have been formed from at least two polymers extruded from the same extruder as a blend. The term "blend" is defined below. Biconstituent fibers do not have the various polymer components arranged in relatively constantly positioned distinct zones across the cross-sectional area of the fiber and the various polymers are usually not continuous along the entire length of the fiber, instead usually forming fibrils or protofibrils which start and end at random. Biconstituent fibers are sometimes also referred to as multiconstituent fibers. Fibers of this general type are discussed in, for example, U.S. Pat. No. 5,108,827 to Gessner. Bicomponent and biconstituent fibers are also discussed in the textbook Polymer Blends and Composites by John is A. Manson and Leslie H. Sperling, copyright 1976 by Plenum Press, a division of Plenum Publishing Corporation of New York, IBSN 0-306-30831-2, at pages 273 through 277.

As used herein the term "blend" as applied to polymers, means a mixture of two or more polymers while the term "alloy" means a sub-class of blends wherein the components are immiscible but have been compatibilized. "Miscibility" and "immiscibility" are defined as blends having negative and positive values, respectively, for the free energy of mixing. Further, "compatibilization" is defined as the process of modifying the interfacial properties of an immiscible polymer blend in order to make an alloy.

As used herein the term "nonwoven fibrous web" means a web having a structure of individual fibers or filaments which are interlaid, but not in an identifiable manner as in a knitted or woven fabric. Nonwoven fabrics or webs have been formed from many processes such as for example, meltblowing processes, spunbonding processes, and dry-forming techniques such as carding and air-laying processes. The basis weight of nonwoven fabrics is usually expressed in grams per square meter (gsm) or ounces of material per square yard (osy) and the fiber diameters useful are usually expressed in microns. (Note that to convert from osy to gsm, multiply osy by 33.91.)

As used herein the term "meltblown fibers" means fibers formed by extruding a molten thermoplastic material through a plurality of fine, usually circular, die capillaries as molten threads or filaments into converging high velocity gas (e.g. air) streams which attenuate the filaments of molten thermoplastic material to reduce their diameter. Thereafter, the meltblown fibers are carried by the high velocity gas stream and are deposited on a collecting surface to form a web of randomly dispersed meltblown fibers. Such a process is disclosed, for example, in U.S. Pat. No. 3,849,241 to Butin. Meltblown fibers may be continuous or discontinuous, are generally smaller than 10 microns in diameter, and are generally tacky when deposited onto a collecting surface.

As used herein the term "staple fiber webs" refers to dry-formed nonwoven webs of staple fibers such as those made by carding or air-laying processes. Briefly, the air forming or air-laying process is a well known process by which a fibrous nonwoven web can be formed. In the air-laying process, bundles of small fibers having typical lengths ranging from about 3 to about 50 millimeters (mm) are separated and entrained in an air supply or air stream and then deposited onto a forming screen or other foraminous forming surface, usually with the assistance of a vacuum supply, in order to form a dry-laid fiber web. Equipment for producing air-laid webs includes the Rando-Weber air-former machine available from Rando Corporation of New York and the Dan-Web rotary screen air former machine available from Dan-Web Forming of Risskov, Denmark.

As used herein "carded webs" refers to nonwoven webs formed by carding processes as are known to those skilled in the art and further described, for example, in coassigned U.S. Pat. No. 4,488,928 to Alikhan and Schmidt which is incorporated herein in its entirety by reference. Briefly, carding processes involve starting with staple fibers in a bulky batt that is combed or otherwise treated to provide a web of generally uniform basis weight.

As used herein, the term "thermally compatible" refers to polymers having similar melting temperature ranges, such that components made from the polymers may be successfully laminated together by thermal bonding, without the need of excessive temperature and/or pressure. The term "thermally incompatible" refers to dissimilar polymers or polymers (or components made from the polymers) having dissimilar melting temperature ranges, such that the temperatures required to thermally laminate the components are destructive to one or more of the components, such as by burning holes through those components, or by causing the entire laminate material to be stiff.

As used herein, a "bonding agent" refers to an additive which may be incorporated into the polymer of one or more of the components of the laminate and which will thereby allow bonding of the laminate components at a lower temperature. Bonding agents are useful in facilitating bonding of components made from thermally incompatible polymers and their use is described in for example, U.S. Pat. No. 6,238,767 to McCormack and Haffner and U.S. Pat. No. 5,695,868 to McCormack and include but are not limited to amorphous polymers, such as a propene-rich polyalphaolefin terpolymer or copolymer, polyamides, ethylene copolymers, hydrocarbon resins, polyterpene resins, atactic polypropylene and amorphous polypropylene, and others.

As used herein, "thermal point bonding" involves passing a fabric or web of fibers or other sheet layer material to be bonded between a heated calender roll and an anvil roll. The calender roll is usually, though not always, patterned in some way so that the entire fabric is not bonded across its entire surface. As a result, various patterns for calender rolls have been developed for functional as well as aesthetic reasons. An example of a pattern is the Hansen Pennings or "H&P" pattern with about a 30% bond area with about 200 bonds/square inch (about 31 bonds/cm2) as taught in U.S. Pat. No. 3,855,046 to Hansen and Pennings. The H&P pattern has square point or pin bonding areas wherein each pin has a side dimension of 0.038 inches (0.965 mm), a spacing of 0.070 inches (1.778 mm) between pins, and a depth of bonding of 0.023 inches (0.584 mm). The resulting pattern has a bonded area of about 29.5%. Another typical point bonding pattern is the expanded Hansen and Pennings or "EHP" bond pattern which produces a 15% bond area with a square pin having a side dimension of 0.037 inches (0.94 mm), a pin spacing of 0.097 inches (2.464 mm) and a depth of 0.039 inches (0.991 mm). Another typical point bonding pattern designated "714" has square pin bonding areas wherein each pin has a side dimension of 0.023 inches (0.584 mm), a spacing of 0.062 inches (1.575 mm) between pins, and a depth of bonding of 0.033 inches (0.838 mm). The resulting pattern has a bonded area of about 15%. Yet another common pattern is the C-Star pattern which has a bond area of about 16.9%. The C-Star pattern has a cross-directional bar or "corduroy" design interrupted by shooting stars. Other common patterns include a diamond pattern with repeating and slightly offset diamonds and a wire weave pattern looking as the name suggests, e.g. like a window screen. Typically, the percent bonding area varies from around 10% to around 30% of the area of the fabric laminate web.

As used herein, "smooth calender bonding" involves passing a fabric or web of fibers to be bonded between a two rolls, wherein, unlike the point bonding described above, both rolls are smooth or unpatterned. The rolls may be heated or unheated, depending on the material to be thus bonded. For example, if several layers are to be bonded together and one or more of the layers is in a molten or partially molten state, wherein the polymer is still in a conformable or adhesive state, the layers may be bonded together by the application of pressure alone without use of external heat.

As used herein, the term "hydrophilic" means that the polymeric material has a surface free energy such that the polymeric material is wettable by an aqueous medium, i.e. a liquid medium of which water is a major component. The hydrophilicity of the polymeric material can be measured in accordance with the ASTM-D-724-89 contact angle testing procedure. For example, a hydrophilic polymer has an initial contact angle equal to or less than about 90°. Depending on material application needs and degree of hydrophilicity desired, this term includes materials where the initial contact angle may desirably be equal to or less than about 75°, or even equal to or less than about 50°. The term "initial contact angle" as used herein indicates a contact angle measurement made within about 5 seconds of the application of water drops on a test film specimen. The term "hydrophobic" includes those materials that are not hydrophilic as defined. It will be recognized that hydrophobic materials may be treated internally or externally with surfactants and the like to render them hydrophilic.

DESCRIPTION OF THE INVENTION

The present invention is directed to low cost elastic laminate materials, particularly to laminates of extensible nonwoven fibrous webs and thermoplastic elastic materials, as well as to the process for making such laminates, and to applications for using these laminates as elastic materials having cloth-like tactile aesthetic attributes.

The invention will be described with reference to the drawings which illustrate certain embodiments. It will be apparent to those skilled in the art that these embodiments do not represent the full scope of the invention which is broadly applicable in the form of variations and equivalents as may be embraced by the claims appended hereto. It is intended that the scope of the claims extend to all such variations and equivalents.

FIG. 1 schematically illustrates a process for forming the elastic laminate material of the present invention. Although the invention as illustrated in FIG. 1 utilizes staple fiber webs which are carded webs, it will be understood that the elastic laminate material may be formed from nonwoven fibrous webs which are staple fiber webs produced by other processes such as for example air-laying processes. Nonwoven fibrous webs are formed as non-bonded staple fiber carded webs 12 and 22 by carding machines 10 and 20. Non-bonded carded web 12 is directed onto conveyor 30, which is an endlessly moving belt, where it is carried under roll unwind 50. Thermoplastic elastic material 52 is unwound from roll unwind 50 and directed onto non-bonded carded web 12 on conveyor 30. Then, non-bonded carded web 22 is directed onto thermoplastic elastic material 52. Thereafter, non-bonded carded webs 12 and 22, and thermoplastic elastic material 52 are directed between lamination bonding rollers 60 and 70 where elastic laminate material 72 is formed by bonding non-bonded carded web 12 to one side or surface of thermoplastic elastic material 52 and non-bonded carded web 22 to the other side or surface of thermoplastic elastic material 52. Elastic laminate material 72 may then be wound up on material roll 82.

As described above, nonwoven fibrous webs useful in the elastic laminate material of the present invention may be non-bonded carded webs. "Carded web" is used herein to mean a nonwoven web prepared from thermoplastic staple fibers which are usually supplied in bales. Fibers from the bales are placed in a picker which separates the fibers. Next, the fibers are sent through a combing or carding unit which further breaks apart and aligns the staple fibers in the machine direction so as to form a machine direction-oriented nonwoven fibrous web. Carding processes are known to those skilled in the art and are further described, for example, in coassigned U.S. Pat. No. 4,488,928 to Alikhan and Schmidt. In conventional dry-forming processes such as carding and air-laying, the staple fiber web is generally then bonded by one or more of several bonding methods, such as thermal point bonding or through air bonding. However, it is important that the nonwoven fibrous webs used in the present invention not be bonded until such time as they are laminated to the thermoplastic elastic material. Therefore, as used herein, the term "non-bonded staple fiber web" means the staple fiber web as produced by conventional dry-forming processes as are known in the art with the exception that the staple fiber web has not been subjected to a separate thermal bonding or other bonding process until such time as the entire elastic laminate material is formed by laminate bonding of the three component materials. The term "non-bonded staple fiber web" does not exclude the fiber contact and limited amount of fiber-to-fiber entanglement such as are generally imparted by conventional dry-forming processes. Since the staple fiber webs are not bonded prior to lamination bonding, the staple fiber webs will be less restrictive to the elastic properties of the thermoplastic elastic material. Additionally, since the staple fiber webs are not bonded prior to lamination bonding, the costs of the entire manufacturing step or steps of pre-bonding the staple fiber webs, and the costs of equipment associated with that bonding step have been removed from the process, substantially reducing the cost of the final elastic laminate material.

The non-bonded staple fiber webs useful in the elastic laminate material of the present invention are composed of thermoplastic polymer fibers and desirably have a basis weight of from about 1 to about 34 grams per square meter (gsm). In particularly low cost applications, lighter basis weight non-bonded staple fiber webs, such as those having basis weights of from about 1 gsm to about 10 gsm, may be used. Where heavier-weight non-bonded staple fiber webs are used, for example those having basis weights greater than about 17 gsm, the webs will advantageously have a greater alignment or orientation of fibers in the machine-direction than in the cross machine-direction. By "machine-direction" or "MD" what is meant is the length dimension of the web in the direction in which the web is produced. The term "cross machine-direction" or "CD" means the width dimension of the web, that is, the direction generally perpendicular to the MD. By having an alignment or orientation of the fibers which is greater in the MD than the CD, the web, once bonded together with the elastic material to form the laminate, will have fewer fibers running in the CD than in the MD which are involved in bonds. In this fashion, the staple fiber webs will be more easily extensible in the CD, and therefore be less restrictive to the elastic properties of the thermoplastic elastic material and allow the entire elastic laminate material to utilize the elastic properties of stretch and recovery. For example, non-bonded staple fiber webs having basis weights greater than about 17 gsm may advantageously have a MD to CD orientation ratio of from about 2:1 to about 40:1. More particularly, webs greater than about 17 gsm may advantageously have a MD to CD orientation ratio from about 5:1 to about 40:1. The MD to CD orientation ratio may be measured as the ratio of the MD tensile strength to the CD tensile strength, by taking a sample of the non-bonded staple fiber webs to be used in the laminate, bonding it by smooth calendering or by pattern bonding with a pattern which is geometrically uniform in the MD and CD, and then measuring the MD and CD tensile strengths. For example, if the MD breaking tensile of the web is twice the CD breaking tensile, the web may be considered to have a 2:1 MD:CD orientation ratio.

The fibers of the non-bonded staple fiber webs may be monocomponent or conjugate thermoplastic polymer fibers, alone or in combination, and may be a blend of two or more types of monocomponent or two or more types of conjugate fibers. Additionally, the fiber type composition for each of the two non-bonded staple fiber webs may be substantially identical; however, since two carding machines may be used the two non-bonded staple fiber webs may also comprise different fiber types from each other. For example, one or both non-bonded staple fiber webs may comprise from about 100 to 0 percent by weight of monocomponent thermoplastic polymer fibers and from about 0 to 100 percent by weight of conjugate thermoplastic polymer fibers. As another example, essentially all of the fibers in the non-bonded staple fiber web may be conjugate thermoplastic polymer fibers, such as for example sheath-core fibers or side-by-side fibers. Useful polymers include polyolefins such as polypropylene and polyethylene, polyesters, nylon, rayon, acetates, and copolyesters.

In certain embodiments, at least one type of monocomponent fiber, or at least one component of one type of conjugate fiber where conjugate fibers are used, may be selected as a lower melting temperature binder component to be thermally compatible with the thermoplastic elastic material as an aid in bonding the laminate together. By way of example, where the polymer selected for the elastic film is a polyolefin, at least some of the fibers, or a portion of some of the fibers where conjugate fibers are used, may also be polyolefin to facilitate bonding. Where the polymers selected for the elastic material and the fibers are thermally incompatible, a bonding agent as described in detail below may be beneficially added to some or all of the fibers, or to a portion of some or all of the fibers where conjugate fibers are used, in order to facilitate laminate bonding.

Referring again to FIG. 1, thermoplastic elastic material 52 unwound from roll 50 may be an elastic film such as a single-layer film or multi-layer film, or may be a fibrous thermoplastic elastic material such as, for example, an elastic meltblown layer or an elastic scrim or elastic netting layer. Thermoplastic elastic materials useful in the present invention will have basis weights ranging from about 10 gsm to about 70 gsm. Elastic polymers useful in the thermoplastic elastic material include polyurethanes, polyether esters, block copolymers, and elastic polyolefins.

Examples of elastic block copolymers include those having the general formula A-B-A' or A-B, where A and A' are each a thermoplastic polymer endblock which contains a styrenic moiety such as a poly (vinyl arene) and where B is an elastomeric polymer midblock such as a conjugated diene or a lower alkene polymer such as for example polystyrene-poly(ethylene-butylene)-polystyrene or SEBS styrenic block copolymers. Also included are polymers composed of an A-B-A-B tetrablock copolymer, as discussed in U.S. Pat. No. 5,332,613 to Taylor et al. In such polymers, A is a thermoplastic polymer block and B is an isoprene monomer unit hydrogenated to substantially a poly(ethylene-propylene) monomer unit. An example of such a tetrablock copolymer is a styrene-poly(ethylene-propylene)-styrene-poly(ethylene-propylene) or SEPSEP styrenic block copolymer. These A-B-A' and A-B-A-B styrenic block copolymers are available in several different formulations from Kraton Polymers of Houston, Tex. under the trade designation KRATON®.

Examples of elastic polyolefins include ultra-low density elastic polypropylenes and polyethylenes, such as those produced by "single-site" or "metallocene" catalysis methods. Such polymers are commercially available from the Dow Chemical Company of Midland, Mich. under the trade name ENGAGE®, and described in U.S. Pat. Nos. 5,278,272 and 5,272,236 to Lai et al. entitled "Elastic Substantially Linear Olefin Polymers". Also useful are certain elastomeric polypropylenes such as are described, for example, in U.S. Pat. No. 5,539,056 to Yang et al. and U.S. Pat. No. 5,596,052 to Resconi et al., incorporated herein by reference in their entireties, and polyethylenes such as AFFINITY® EG 8200 from Dow Chemical of Midland, Mich. as well as EXACT® 4049, 4011 and 4041 from Exxon of Houston, Tex., as well as blends.

As indicated above, the thermoplastic elastic material 52 unwound from roll 50 may be a multi-layer film. Multi-layer films can be formed by a wide variety of processes well known to those of ordinary skill in the film forming industry. Two particularly advantageous processes are cast film coextrusion processes and blown film coextrusion processes. In such processes, the multiple layers of the film are formed simultaneously and exit the extruder in a multi-layer form. Such multi-layer films and process are described in, for example, U.S. Pat. No. 4,522,203 to Mays and U.S. Pat. No. 4,734,324 to Hill.

A multi-layer film useful in the present invention may have a core or central layer of a thermoplastic elastic material, and thin external or "skin" layers which comprise a bonding agent, so as to facilitate bonding of the elastic film to the nonwoven fibrous webs. The individual skin layers may be quite thin, comprising as little as 30 percent to 3 percent by weight of the multi-layer film. Such multi-layer films are described in, for example, U.S. Pat. No. 6,114,024 to Forte and in U.S. Pat. No. 6,309,736 to McCormack et al, incorporated herein by reference in their entireties. Examples of bonding agents are described in, for example, U.S. Pat. No. 6,238,767 to McCormack and Haffner and U.S. Pat. No. 5,695,868 to McCormack, incorporated herein by reference in their entireties, and include but are not limited to amorphous polymers, such as a propene-rich polyalphaolefin terpolymer or copolymer, polyamides, ethylene copolymers such as ethylene vinyl acetate (EVA), ethylene ethyl acrylate (EEA), ethylene acrylic acid (EAA), ethylene methyl acrylate (EMA) and ethylene normal-butyl acrylate (ENBA), wood rosin and its derivatives, hydrocarbon resins, polyterpene resins, atactic polypropylene and amorphous polypropylene. Also included are predominantly amorphous ethylene propylene copolymers commonly known as ethylene-propylene rubber (EPR) and a class of materials referred to as toughened polypropylene (TPP) and olefinic thermoplastic polymers where EPR is mechanically dispersed or molecularly dispersed via in-reactor multistage polymerization in polypropylene or polypropylene/polyethylene blends. Commercially available amorphous polyalphaolefins, such as those used in hot melt adhesives, are suitable for use with the present invention and include, but are not limited to, REXTAC® ethylene-propylene APAO E-4 and E-5 and butylene-propylene BM-4 and BH-5, and REXTAC® RT2301, RT2503A, RT2780 and RT2557-52R from Huntsman Corporation of Odessa, Tex., and VESTOPLAST® 792 from Huls AG of Marl, Germany. An example of a different class of amorphous polymers is Catalloy® polymer from Montell USA, Inc. of Wilmington, Del., which is an olefinic multistep reactor product wherein an amorphous ethylene propylene random copolymer is molecularly dispersed in a predominantly semicrystalline high-percent propylene monomer/low-percent ethylene monomer continuous matrix, an example of which is described in U.S. Pat. No. 5,300,365 to Ogale.

Where thermoplastic elastic material 52 is a single-layer elastic film, at least some of the fibers in the non-bonded staple fiber web, or a portion of at least some of the fibers where conjugate fibers are used, may be selected to be thermally compatible to facilitate laminate bonding. Alternatively, bonding agents as described above may be blended into the polymer of the elastic film, or into the polymer of some of the fibers, or both, to facilitate bonding.

For certain applications it will be important to provide an elastic laminate material which provides a breathable barrier material. Articles made from breathable barrier materials can provide more comfort to the wearer since the migration of water vapor through the material helps reduce and/or limit discomfort resulting from excess moisture trapped against the skin and can potentially contribute to improved skin wellness. Where a breathable barrier elastic laminate material is desired the thermoplastic elastic material may be a single- or multi-layer breathable monolithic or microporous barrier film which acts as a barrier to passage of aqueous liquids, yet allows the passage of water vapor and air. Monolithic breathable films can exhibit good breathability when they comprise polymers which inherently have good water vapor transmission or diffusion rates such as, for example, polyurethanes, polyether esters, polyether amides, EMA, EEA, EVA and the like. Examples of elastic breathable monolithic films are described in U.S. Pat. No. 6,245,401 to Ying et al., incorporated herein by reference in its entirety, and include those comprising polymers such as thermoplastic (ether or ester) polyurethane, polyether block amides, and polyether esters.

Microporous elastic films may also be used where a breathable elastic laminate material is desired. Microporous breathable films contain a filler material, such as for example calcium carbonate particles, in an amount usually from about 30 percent to 70 percent by weight of the film. The filler-containing film (or "filled film") is then stretched or oriented to open micro-voids around the filler particles in the film, which micro-voids allow for the passage of air and water vapor through the film. In the practice of the present invention and where use of a breathable microporous elastic film is desired, a previously stretch-oriented filled film may be unwound from roll 50. Alternatively, the process in FIG. 1 may additionally include stretching rollers to orient the film prior to laminating the film to the nonwoven fibrous webs. Breathable microporous elastic films containing fillers are described in, for example, U.S. Pat. Nos. 6,015,764 and 6,111,163 to McCormack and Haffner, U.S. Pat. No. 5,932,497 to Morman and Milicevic, and in PCT App. No. PCT/US00/17558 (WO 01/00398 published Jan. 4, 2001) to Taylor and Martin, all incorporated herein by reference in their entireties.

In yet another embodiment of the invention, a cellular elastic film may be used to provide breathability where a breathable elastic laminate material is desired. Breathable cellular elastic film may be produced by mixing the elastic polymer resin with a cell opening agent which decomposes or reacts to release a gas that forms cells in the elastic film. The cell opening agent can be an azodicarbonamide, fluorocarbons, low boiling point solvents such as for example methylene chloride, water, or other agents such as are known to those skilled in the art to be cell opening or blowing agents which will create a vapor at the temperature experienced in the film die extrusion process. Cellular elastic films are described in PCT App. No. PCT/US99/31045 (WO 00/39201 published Jul. 6, 2000) to Thomas et al., incorporated herein by reference in its entirety.

Referring again to FIG. 1, non-bonded carded webs 12 and 22, and thermoplastic elastic material 52, are directed between lamination bonding rollers 60 and 70 to form elastic laminate material 72. Lamination bonding rollers 60 and 70 are thermal bonding rollers and may provide for either pattern bonding or smooth calender bonding. Because the fibers of the non-bonded staple fiber webs have not previously been bonded, the lamination bonding step serves the dual purpose of forming inter-fiber bonds within the staple fiber webs, and forming staple fiber web to thermoplastic elastic material bonds. Various patterns for calender rolls have been developed for functional as well as aesthetic reasons. One example of a pattern is the Hansen and Pennings or "H&P" pattern with about a 30% bond area with about 200 bonds/square inch (about 31 bonds/cm2) as taught in U.S. Pat. No. 3,855,046 to Hansen and Pennings. The H&P pattern has square point or pin bonding areas wherein each pin has a side dimension of 0.038 inches (0.965 mm), a spacing of 0.070 inches (1.778 mm) between pins, and a depth of bonding of 0.023 inches (0.584 mm). Another typical point bonding pattern is the expanded Hansen and Pennings or "EHP" bond pattern which produces a 15% bond area with a square pin having a side dimension of 0.037 inches (0.94 mm), a pin spacing of 0.097 inches (2.464 mm) and a depth of 0.039 inches (0.991 mm). Another typical point bonding pattern designated "714" has square pin bonding areas wherein each pin has a side dimension of 0.023 inches (0.584 mm), a spacing of 0.062 inches (1.575 mm) between pins, and a depth of bonding of 0.033 inches (0.838 mm). The resulting pattern has a bonded area of about 15%. Yet another common pattern is the wire weave pattern looking as the name suggests, e.g. like a window screen, which has about 302 pins/square inch (47 pins/cm2) with a bond area of about 15% to about 20%. Descriptions of other bonding patterns which may be advantageously used in bonding the laminate of the present invention include those described in U.S. Pat. No. 5,620,779 to Levy and McCormack wherein the bond patterns have a ratio of space between bond points to unit width (the distance from the beginning of a column of bond points to the beginning of the next nearest column of bond points as measured in the cross machine direction) of at least about 0.30:1. Bonding patterns having this minimum space to unit width ratio of about 0.30:1 leave columns of unbonded areas extending along the laminate, unbonded areas which may present less resistance to elongation of the laminate. For example, the wire weave pattern described above is described in U.S. Pat. No. 5,620,779 to Levy and McCormack as having a space to unit width ratio of about 0.45:1. Typically for thermal pattern bonding, the percent bonding area varies from around 10% to around 30% of the area of the fabric laminate web.

Lastly, the process schematically depicted in FIG. 1 further includes winding roll 82 for taking up the finished elastic laminate material 72. Alternatively, laminate 72 may be directed for further processing, or into a converting process for the making of a product.

Figure 2:
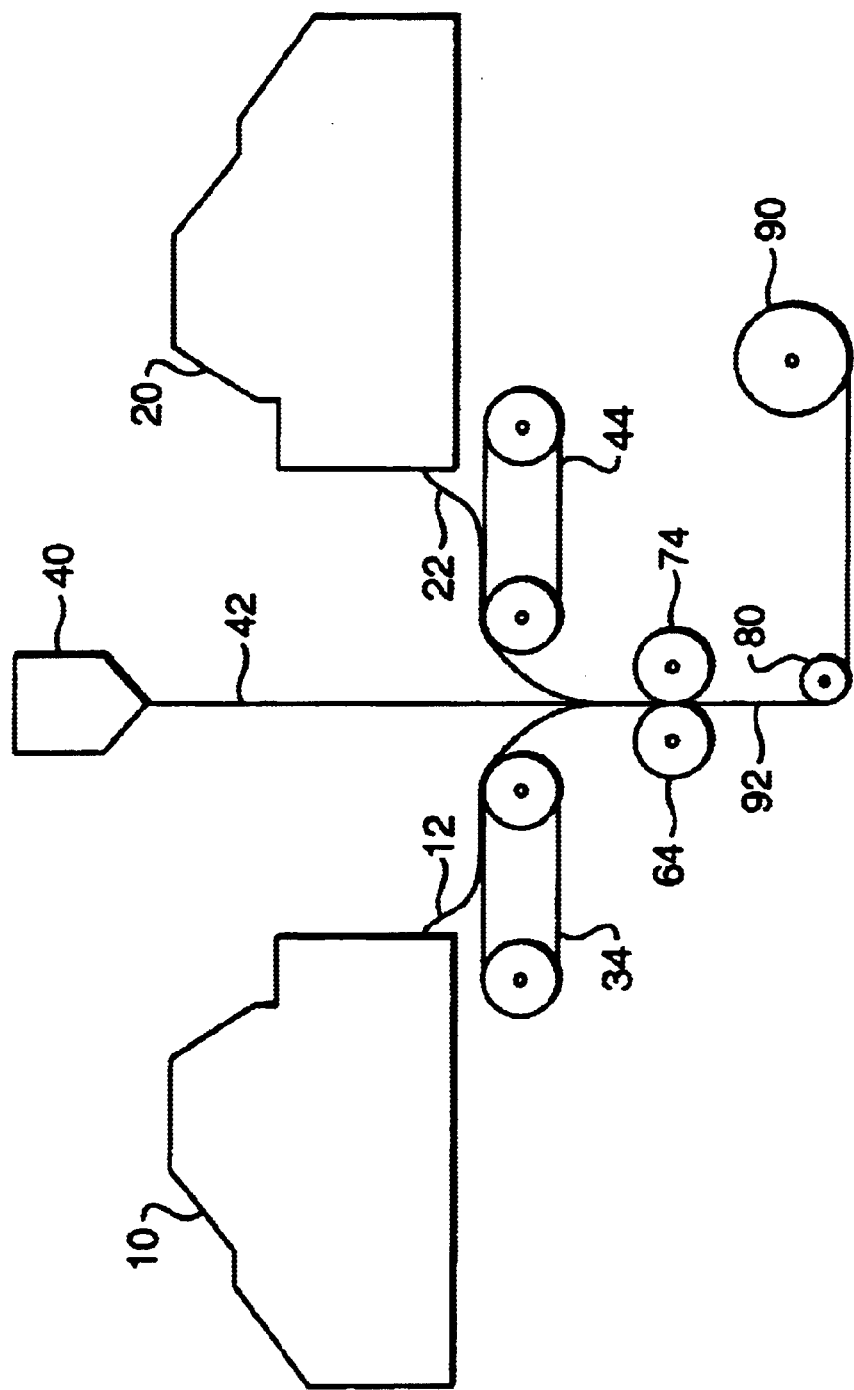
FIG. 2 is a schematic illustration of an alternative process for forming the elastic laminate material of the present invention.

Referring now to FIG. 2, there is shown schematically a process for forming another embodiment of the elastic laminate material of the present invention. Although the invention as illustrated in FIG. 2 utilizes staple fiber webs which are carded webs, it will be understood that the elastic laminate material may be formed from nonwoven fibrous webs which are staple fiber webs produced by other processes such as for example air-laying processes. The process in FIG. 2 is similar to that described above with reference to FIG. 1, with the following exceptions. In the place of unwinding thermoplastic elastic material between non-bonded carded webs 12 and 22, film die 40 directly extrudes elastic film 42 between the non-bonded carded webs, so that the film is still in a molten or partially molten state at the time the elastic laminate material is formed by lamination bonding at rollers 64 and 74. Carding machines 10 and 20 are disposed in a face-to-face configuration rather than in the tandem configuration shown in FIG. 1, with conveyors 34 and 44 directing non-bonded carded webs 12 and 22 to the center of the process, that is towards either side or surface of the just-extruded elastic film 42.

In addition, since elastic film 42 is still in a molten state or partially molten state when the non-bonded carded webs are pressed into contact with it, elastic film 42 is still in a conformable or adhesive state such that lamination bonding at rollers 64 and 74 may take place without the addition of external heat from the rollers. Extruded elastic film 42 may be a single-layer or multi-layer elastic film as described in the above embodiments with reference to FIG. 1, and may contain bonding agents as described above.

Non-bonded carded webs 12 and 22 may have any of the fiber compositions described in the above embodiments with reference to FIG. 1, and a portion or all of the fibers of either or both non-bonded carded webs may contain bonding agents as described above. Bonding of the non-bonded carded webs and the extruded elastic film to form the elastic laminate material at rollers 64 and 74 may be accomplished by either pattern or smooth calender bonding, as described in the embodiments with reference to FIG. 1.

Lastly, the process schematically depicted in FIG. 2 further includes turning roller 80 which directs elastic laminate material 92 to winding roll 90 for taking up the finished material. Alternatively, laminate 92 may be directed for further processing, or into a converting process for the making of a product.

While not shown here, other embodiments are contemplated to be within the scope of the invention. As an example, the elastic laminate material may be a two-layer laminate of one nonwoven fibrous web bonded to the thermoplastic elastic material. Additionally, the elastic laminate material may be formed by means other than thermal roll bonding such as ultrasonic bonding methods and/or adhesive bonding methods as are well known in the art. As another example, the extruded film as described in FIG. 2 may be cast onto a chilled roller and cooled, and thereafter directed between the nonwoven fibrous web layers prior to bonding.

Figure 3:
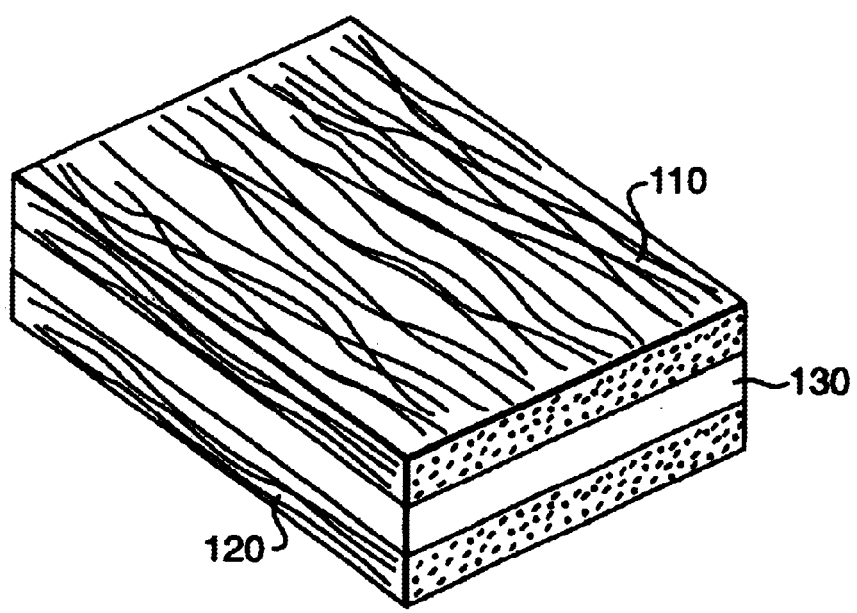
FIG. 3 is a schematic illustration of an embodiment of the elastic laminate material of the present invention.

Referring now to FIG. 3, there is shown a schematic illustration of an embodiment of the elastic laminate material of the present invention, wherein nonwoven fibrous webs 110 and 120 have been laminated to either side or surface of thermoplastic elastic material 130.

While not shown here, various additional potential processing and/or finishing steps known in the art such as aperturing, slitting, stretching, treating, or further lamination of the elastic laminate material with other films or other nonwoven layers, may be performed without departing from the spirit and scope of the invention. Examples of web finishing treatments include electret treatment to induce a permanent electrostatic charge in the web, or antistatic treatments. Another example of web treatment includes treatment to impart wettability or hydrophilicity to a web comprising hydrophobic thermoplastic material. Wettability treatment additives may be incorporated into the polymer melt as an internal treatment, or may be added topically at some point following filament or web formation. Still another example includes imparting apertures in the nonwoven fibrous webs before bonding the laminate together, such as by hydraulic arrangement of the fibers with water streams, which aperturing may further increase the extensibility of the nonwoven fibrous webs.

EXAMPLES

Example 1

Non-bonded staple fiber webs comprising 100% polypropylene staple fibers were produced on two Hollingsworth carding machines available from John D. Hollingsworth On Wheels of Greenville, S.C. Each non-bonded staple fiber web had a basis weight of 24 gsm. The polyproplylene fibers were 2.2 denier, 1.5 inch (38 mm) fibers available from Fiber Visions of Covington, Ga. and designated T-196 PP fiber. A single-layer elastic film was cast onto a chill roller and thereafter directed between the two non-bonded staple fiber webs. The film was a 40 gsm ethylene-octene copolymer plastomer film available from Dow Chemical Company of Midland, Mich. under the trade name AFFINITY EG 8200. The two non-bonded staple fiber webs were then thermally bonded to either side of the elastic film using thermal pattern bonding, with the calender having a wire weave pattern. The bonding temperature was set at 280° F. (138° C.). After being elongated to 150 percent of its original unstretched CD dimension, a sample of the elastic laminate material of Example 1 recovered 80 percent of that elongation upon release of the stretching force.

Example 2

Non-bonded staple fiber webs comprising 100% polypropylene/polyethylene bicomponent eccentric sheath-core staple fibers were produced on two Hollingsworth carding machines available from John D. Hollingsworth On Wheels of Greenville, S.C. Each non-bonded staple fiber web had a basis weight of 24 gsm. The polypropylene fibers were 1.5 denier, 1.5 inch (38 mm) fibers available from ES FiberVisions of Athens, Ga. and designated ESC-215 fiber. A single-layer elastic film was cast onto a chill roller and thereafter directed between the two non-bonded staple fiber webs. The film was a 40 gsm ethylene-octene copolymer plastomer film available from Dow Chemical Company of Midland, Mich. under the trade name AFFINITY EG 8200. The two non-bonded staple fiber webs were then thermally bonded to either side of the elastic film using thermal pattern bonding, with the calender having a wire weave pattern. The bonding temperature was set at 280° F. (138° C.). After being elongated to 150 percent of its original unstretched CD dimension, a sample of the elastic laminate material of Example 2 recovered 78 percent of that elongation upon release of the stretching force.

Example 3

Non-bonded staple fiber webs and elastic film were produced as in Example 1 with the exception that the non-bonded staple fiber webs each had a basis weight of 12 gsm. The non-bonded staple fiber webs and elastic film were bonded into a laminate using the wire weave patterned calender as in Example 1. After being elongated to 150 percent of its original unstretched CD dimension, a sample of the elastic laminate material of Example 3 recovered 84 percent of that elongation upon release of the stretching force.

Example 4

Non-bonded staple fiber webs were produced as in Example 1 (24 gsm). The film was a 40 gsm single layer film produced from a blend of 70 percent by weight ethylene-octene copolymer plastomer film available from Dow Chemical Company of Midland, Mich. under the trade name AFFINITY EG 8200 and 30 percent by weight polystyrene-poly(ethylene-butylene)-polystyrene block copolymer or "SEBS" elastic styrenic block copolymer available from Kraton Polymers of Houston, Tex. under the trade designation KRATON® G-1657. The elastic film was cast onto a chill roller and thereafter directed between the two non-bonded staple fiber webs. The two non-bonded staple fiber webs were then thermally bonded to either side of the elastic film using thermal pattern bonding, with the calender having a wire weave pattern. The bonding temperature was set at 280° F. (138° C.). After being elongated to 150 percent of its original unstretched CD dimension, a sample of the elastic laminate material of Example 4 recovered 88 percent of that elongation upon release of the stretching force.

Numerous other patents have been referred to in the specification and to the extent there is any conflict or discrepancy between the teachings incorporated by reference and that of the present specification, the present specification shall control. Additionally, while the invention has been described in detail with respect to specific embodiments thereof, it will be apparent to those skilled in the art that various alterations, modifications and/or other changes may be made without departing from the spirit and scope of the present invention. It is therefore intended that all such modifications, alterations and other changes be encompassed by the claims.

We claim:

1. An elastic laminate material comprising a thermoplastic elastic material and a first non-bonded staple fiber web layer, said non-bonded staple fiber web layer bonded to said thermoplastic elastic material, wherein said thermoplastic elastic material comprises elastic polyolefin or a blend of elastic polyolefin and styrenic block copolymer, and further wherein said thermoplastic elastic material comprises a multi-layer film comprising first and external skin layers, each in an amount of from about 3 weight percent to about 20 weight percent of said multi-layer film, said first and second external skin layers comprising a bonding agent, and an interior layer of an elastic polymer in an amount of from about 60 weight percent to about 94 weight percent of the multi-layer film.

2. The elastic laminate material of claim 1 further comprising a second non-bonded staple fiber web layer bonded to the side of said thermoplastic elastic material opposite from said first web layer.

3. The elastic laminate material of claim 2 wherein said staple fibers comprise bicomponent binder fibers comprising a low melting polymeric component and a high melting polymeric component, said low melting polymeric component exposed on at least a portion of the outer surface of said binder fiber, and said low melting polymeric component being thermally compatible with said thermoplastic elastic material.

4. The elastic laminate material of claim 1 wherein said thermoplastic elastic material comprises a breathable barrier film.

5. The elastic laminate material of claim 2 wherein said thermoplastic elastic material comprises a breathable barrier film.

6. The elastic laminate material of claim 1 wherein at least some of said staple fibers comprise a bonding agent.

7. The elastic laminate material of claim 2 wherein at least some of said staple fibers comprise a bonding agent.

8. The elastic laminate material of claim 1 wherein said non-bonded staple fiber web layer is a carded web layer.

9. The elastic laminate material of claim 2 wherein said first and second non-bonded staple fiber web layers each have a basis weight between about 1 gsm and about 34 gsm.

10. The elastic laminate material of claim 9, wherein said first and second non-bonded staple fiber web layers are carded web layers each having a basis weight of between about 18 gsm and about 34 gsm and each having a MD to CD orientation ratio of between about 2:1 and 40:1.

11. The elastic laminate material of claim 9 wherein said first and second non-bonded staple fiber web layers each have a basis weight of about 10 gsm or less.

12. The elastic laminate material of claim 2 wherein said thermoplastic elastic material is apertured.

13. The elastic laminate material of claim 2 wherein said elastic laminate material is apertured.

14. The elastic laminate material of claim 2 wherein said thermoplastic elastic material has a basis weight between about 10 gsm and about 68 gsm.

15. The elastic laminate material of claim 2 wherein said staple fibers comprise polymers selected from the group consisting of polyolefins, polyesters, nylon, rayon, acetates, and copolyesters.

16. A personal care absorbent product comprising the elastic laminate material of claim 1.

17. A personal care absorbent product comprising the elastic laminate material of claim 2.

18. A medical care product comprising the elastic laminate material of claim 2.

19. A protective workwear garment comprising the elastic laminate material of claim 2.

20. A process for forming an elastic laminate material comprising the steps of:
  a) forming a first non-bonded staple fiber web layer;
  b) unwinding a thermoplastic elastic material, said thermoplastic elastic material comprising a multi-layer film comprising first and second external skin layers, each in an amount of from about 3 weight percent to about 20 weight percent of said multi-layer film, said first and second external skin layers comprising a bonding agent, and an interior layer of an elastic polymer in amount of from about 60 weight percent to about 94 weight percent of said multi-layer film; and thereafter
  c) forming said laminate by bonding said first non-bonded staple fiber web layer to said thermoplastic elastic material.

21. The process of claim 20 including the additional step a') at forming a second non-bonded staple fiber web layer and in step c) bonding said second web layer to the side of said thermoplastic elastic material opposite from said first web layer.

22. The process of claim 21 wherein said first and second non-bonded staple fiber webs are carded webs.

23. A process for fanning an elastic laminate material comprising the steps of:
  a) forming a first non-bonded staple fiber web layer;
  b) extruding a thermoplastic elastic material, wherein said thermoelastic elastic material comprises a multi-layer film comprising first and second external skin layers, each in an amount of from about 3 weight percent to about 20 weight percent of said multi-layer film, said first and second external skin layers comprising a bonding agent, and an interior layer of an elastic polymer in an amount of from about 60 weight percent to about 94 weight percent of said multi-layer film; and thereafter
  c) forming said laminate by bonding said first non-bonded staple fiber web layer to said thermoplastic elastic material while said thermoplastic elastic material remains in a partially molten state.

24. The process of claim 23 including the additional step a) of forming a second non-bonded staple fiber web layer and in step c) bonding said second web layer to the side of said thermoplastic elastic material opposite from said first web layer.

25. The process of claim 24 wherein said first and second non-bonded staple fiber webs are carded webs.

* * * * *